United States Patent [19]

Myers

[11] Patent Number: 4,833,223

[45] Date of Patent: May 23, 1989

[54] HIGH MOLECULAR WEIGHT POLYSTYRENE AND METHOD

[75] Inventor: Charles L. Myers, Palatine, Ill.

[73] Assignee: Borg-Warner Chemicals, Inc., Parkersburg, W. Va.

[21] Appl. No.: 132,445

[22] Filed: Dec. 14, 1987

[51] Int. Cl.⁴ .................... C08F 26/02; C08F 22/26
[52] U.S. Cl. ................... 526/301; 526/323; 526/323.2; 526/327
[58] Field of Search ............. 526/323, 301, 323.2, 526/327

[56] References Cited

U.S. PATENT DOCUMENTS

| | | |
|---|---|---|
| 2,808,386 | 10/1957 | D'Alelio . |
| 3,098,839 | 7/1963 | Conard et al. . |
| 3,259,595 | 7/1966 | Wright . |
| 3,435,018 | 3/1969 | Natta et al. . |
| 3,645,959 | 2/1972 | Pilato et al. . |
| 3,700,639 | 10/1972 | Hulse . |
| 3,817,965 | 6/1974 | Mace et al. . |
| 3,819,761 | 6/1974 | Lee, Jr. . |
| 3,976,725 | 8/1976 | Lee, Jr. . |
| 4,029,869 | 6/1977 | Ingram et al. . |
| 4,031,166 | 6/1977 | Bronstert et al. . |
| 4,112,209 | 9/1978 | Gunsher et al. . |
| 4,335,037 | 6/1982 | Lordi et al. . |

OTHER PUBLICATIONS

Odian, George, *Principles of Polymerization, Second Edition*, John Wiley & Sons, New York, 1981, pp. 286-288 and 319-339.

*Primary Examiner*—Joseph L. Schofer
*Assistant Examiner*—N. Sarofim
*Attorney, Agent, or Firm*—Lowe, Price, LeBlanc, Becker & Shur

[57] ABSTRACT

A method for producing a high molecular weight polystyrene comprises polymerizing styrene monomer and from about 0.01 to about 2.0 parts by weight per 100 parts by weight total monomer of a polyfunctional monomer in an emulsion polymerization medium. Preferred polyfunctional monomers include allyl groups, vinyl groups or mixtures thereof, and the resultant high molecular polystyrene preferably has a weight average molecular weight, $M_w$, greater than about 400,000.

9 Claims, No Drawings

HIGH MOLECULAR WEIGHT POLYSTYRENE AND METHOD

FIELD OF THE INVENTION

The present invention relates to a method for producing a high molecular weight polystyrene and to the high molecular weight polystyrene produced thereby. More particularly, the present invention relates to a method for producing a high molecular weight polystyrene by polymerizing styrene monomer and a small amount of a polyfunctional monomer in an emulsion polymerization medium.

BACKGROUND OF THE INVENTION

Polystyrene resins are well known in the art and are widely used in industry and in consumer products. Polystyrene resin may be used alone or in polymer blends with other thermoplastic polymers to provide the blends with various advantageous properties. Polystyrene resin is advantageous in that it is inert to many chemical compounds and is generally easy to process, particularly under injection molding techniques. Generally, the physical properties of a specific polystyrene polymer are dependent on the method by which the polystyrene polymer is formed.

For example, the Wright U.S. Pat. No. 3,259,595 discloses polystyrene compositions which are formed by suspension polymerization techniques and which are particularly suitable for expanding to produce a plastic film having a closed cellular structure. Similarly, the Ingram et al U.S. Pat. No. 4,029,869 discloses a method for preparing polystyrene by peroxide-initiated suspension polymerization to provide a polymer product having a broader molecular weight distribution. The suspension polymerization is carried out in the presence of a small amount of a modifying comonomer. The Mace et al U.S. Pat. No. 3,817,965 also discloses the aqueous suspension polymerization of vinyl compounds such as styrene. Mace et al disclose that by carefully controlling the polymerization temperature, high molecular weight polymers exhibiting viscosities of about 9 to about 50 centistokes may be produced.

Additionally, the Pilato et al U.S. Pat. No. 3,645,959 discloses the preparation of high molecular weight vinyl polymers such as polystyrene in non-aqueous dispersions using up to about 1 percent of a diene compound such as norbornadiene. The Gunsher et al U.S. Pat. No. 4,112,209 discloses processes for making polystyrene having a weight average molecular weight Mw between about 200 and about 50,000 and a Mw/Mn ratio of less than about 8 by cationically polymerizing styrene monomer under substantially isothermal conditions in an organic solvent. Highly crystalline isotactic polystyrene polymers having molecular weights less than 1 million may be prepared by the thermal degradation in air of high molecular weight, highly crystalline copolymers of styrene with an alpa-olefin as disclosed in the Hulse et al U.S. Pat. No. 3,700, 639. The Natta et al U.S. Pat. No. 3,435,018 also disclose the production of isotactic polymers of styrene. Specifically, Natta et al disclose the polyermization of monomeric styrene in a heptane solution containing triethyl aluminum catalyst.

As evidenced by the preceding discussion, various methods are known for producing polystyrene resins exhibiting specific physical properties. As the uses for polystyrene resins expand into new fields, it is similarly necessary to develop new methods for producing polystyrene resins exhibiting physical properties required in the new fields of application.

SUMMARY OF THE INVENTION

Accordingly, it is an object of the present invention to provide a new method for producing a polystyrene resin. It is a more specific object of the present invention to provide a method for producing a high molecular weight polystyrene resin, for example, having a weight average molecular weight, Mw, greater than about 400,000. It is an additional object of the invention to provide an improved high molecular weight polystyrene resin.

These and additional objects are provided by the method of the present invention. Specifically, the present invention relates to a method for producing a high molecular weight polystyrene, which method comprises polymerizing styrene monomer and a small amount of a polyfunctional monomer in an emulsion polymerization medium. Generally, the polyfunctional monomer is used in an amount of from about 0.01 to about 2.0 parts by weight per 100 parts by weight total monomer. It is also preferred that the monomers which are polymerized to form the high molecular weight polystyrene consist essentially of styrene monomer and the polyfunctional monomer. The high molecular weight polystyrene which is produced has a weight average molecular weight greater than about 400,000 and a broad molecular weight distribution, for example, a Mw/Mn ratio greater than about 6. The high molecular weight polystyrenes are suitable for use as an additive in polyphenylene ether-high impact polystyrene blends for providing the blends with improved flammability performance.

These and additional objects and advantages according to the method and product of the present invention will be more fully understood in view of the following detailed description.

DETAILED DESCRIPTION

The present invention relates to a method for producing a high molecular weight polystyrene. The method comprises polymerizing styrene monomer and a small amount of a polyfunctional monomer in an emulsion polymerization medium. An emulsion polymerization medium refers to a polymerization medium comprising an aqueous system with monomer as a dispersed phase, an emulsifier and a free radical initiator. The free radicals must be initiated in or capable of migration through the aqueous phase.

An emulsifier or surfactant, such as a soap or detergent, is present in the polymerization medium in an amount which exceeds the critical micelle concentration of the surfactant in water and which is sufficient to stabilize the micells and monomer/polymer particles which are formed by monomer migration from a reservoir of larger monomer droplets. Generally, the emulsifier is present in a range of 0.5 to 5 parts by weight per 100 parts by weight monomer. Initiation of polymerization occurs by addition of the initiating free radical to monomer molecules which are dissolved in the aqueous phase or are present in micellar aggregates. The locus of polymerization is primarily in the monomer/polymer particles, which form by aggregation and migration. The monomer/polymer particles form a stabilized colloidal dispersion of a few hundred to a few thousand angstroms average particle size. Emulsion polymerization of styrene is distinct from suspension polymerization or bulk polymerization, which proceed by a much simpler, noncolloidal mechanism. An important feature of emulsion polymerization is the low rate of free radical combination, or termination, which allows high molecular weights to be obtained in favorable cases.

Generally, the highest molecular weights are obtained in batch reactions in which all of the monomer is charged initially and the instantaneous monomer concentration is maximized. However, batch reactions are fast and exhibit exotherms which are difficult to control in large reactors. The present invention, which incorporates small amounts of multifunctional monomer, allows very high molecular weight polystyrene to be produced, preferably in more controllable semibatch reactions or continuous feed processes which exhibit less of an exotherm problem as compared with batch reactions because of their lower instantaneous monomer concentration. This improvement in the art of polystyrene manufacture allows the production of very high molecular weight polystyrene in a larger reactor. The larger batches provide improved production rates.

Styrene monomer which is suitable for use in practicing the method of the present invention may comprise unsubstituted styrene monomer, $CH(C_6H_5)=CH_2$, or closely relates homologs thereof, for example, alpha-alkyl styrenes such as alpha-methylstyrene, alpha-ethylstyrene and alpha-propylstyrene, ortho-, meta-, and para-ethyl- or -methyl-styrene, halogenated styrenes and the like. Unsubstituted styrene monomer is preferred for use in the method of the present invention.

The styrene monomer is copolymerized in an emulsion polymerization medium with a small amount of a polyfunctional monomer. Preferably, the polyfunctional monomer is present in an amount of from about 0.01 to about 2.0 parts by weight, and most preferably in an amount of from about 0.1 to about 1.0 parts by weight, per 100 parts by weight total monomer. It is believed that the polyfunctional monomer provides a limited degree of branching or crosslinking in the polystyrene polymer and contributes to the high molecular weight of the final product. In a preferred embodiment of the method of the present invention, the monomers which are polymerized in the emulsion polymerization medium consist essentially of the styrene monomer and the polyfunctional monomer.

The polyfunctional monomer has at least two functional groups. Preferably, the functional groups comprise at least two groups having unsaturated carbon-carbon bonds which are capable of reacting with the styrene polymer free radical. In a preferred embodiment, each functional group of the polyfunctional monomer independently comprises an allyl group, $CH_2=CHCH_2-$, or a vinyl group, $CH_2=CH-$. Examples of such polyfunctional monomers include, but are not limited to, diallyl compounds such as diallyl maleate, triallyl compounds such as triallyl isocyanurate, divinyl compounds such as divinyl benzene, bismethacrylates and bisacrylates, and allyl/vinyl compounds such as allyl methacrylate. Allyl compounds are particularly preferred.

Typical emulsion polymerization initiators are suitable for use in the emulsion polymerization medium and include persulfate initiators such as potassium persulfate and hydroperoxide redox initiators such as ferrous iron and hydrogen peroxide. The initiator may be used in conventional amounts, for example, in an amount of from about 0.001 to about 1.0 parts by weight of the total monomers. The emulsion polymerization is preferably conducted at temperatures within the range of about 40° to about 80° C. although either somewhat lower and higher temperatures may be used. In the practice of the method according to the present invention, a semibatch process is preferred as set forth above in order to achieve the heat of exotherm control advantage from the polymerization process. Conventional polymerization reactors may be employed in the process of the invention. As also set forth above, it is believed that the emulsion polymerization medium further contributes to the production of a high molecular weight polystyrene product.

The method of the present invention provides a high molecular weight polystyrene product. Preferably, the polystyrene product has a weight average molecular weight, Mw, greater than about 400,000, and most preferably greater than about 500,000. Additionally, the molecular weight distribution of the high molecular weight polystyrenes produced according to the present invention, Mw/Mn, is relatively large, for example, greater than about 6 and in preferred embodiments greater than about 10.

In addition to the conventional uses known for high molecular weight polystyrenes, the high molecular weight polystyrene produced according to the present invention is particularly adapted for use in polymer blend compositions, for example, polyphenylene ether-high impact polystyrene blends, to provide the polymer blends with improved flammability performance. More specifically, the addition of small amounts of the high molecular weight polystyrenes of the present invention to blends such as polyphenylene ether-high impact polystyrene blends provides the blends with improved flammability performance, for example, as demonstrated by the Underwriters Laboratory UL 94 5V tests. See, for example, the commonly assigned copending application Ser. No. 82,337 filed Aug. 6, 1987 which is incorporated herein by reference for further details in this regard.

The following examples demonstrate the method for producing high molecular weight polystyrene according to the present invention and the products produced thereby.

EXAMPLE 1

A high molecular weight polystyrene resin was prepared according to the method of the present invention as follows. An aqueous phase comprising 120 parts by weight demineralized water and 3 parts by weight of a sodium alkyl benzene sulfonate surfactant were charged to a reactor, stirred and heated to a temperature of about 60° C. The pH of this aqueous phase was adjusted to approximately 6.5. Ten percent of a first mixture comprising 99.6 parts by weight styrene monomer, 0.4 parts by weight allyl methacrylate monomer and 0.3 parts by weight cumene hydroperoxide, and 10 percent of a second mixture comprising 10 parts by weight demineralized water, 0.35 parts by weight of a reducing agent (sodium formaldehyde sulfoxylate), 0.005 parts by weight of a chelating agent (sodium EDTA) and 0.001 parts by weight of an iron salt ($FeSO_4\ 7H_2O$) were then added to the reactor. The remainder of the first mixture was then added to the reactor over a 90 minute period while the remainder of the second mixture was added to the reactor over a 100 minute period. The polymerization reaction proceeded in the resultant emulsion polymerization medium for a period of about one hour while the reaction temperature was maintained at about 60° C. The steam distilled volatiles of the final medium were tested in order to determine the residual amount of monomer remaining in the final medium. The total steam distilled volatiles were approximately 2.5 percent. Additionally, the total solids (polystyrene polymer) of the final medium comprises approximately 42.7 percent, and a 96.1 percent monomer conversion was determined. The molecular weight of the final polystyrene product was determined using high pressure liquid chromatography methods, the results of which are set forth in Table 1.

EXAMPLE 2

High molecular weight polystyrene resins were prepared according to the procedures set forth in Example 1 except that the initial aqueous phase comprised 170 parts by weight demineralized water rather than the 120 parts by weight used in the procedure of Example 1. Additionally, the amount of the polyfunctional monomer which was used in the process was varied and the type of polyfunctional monomer used in the process comprised allyl methacrylate or divinyl benzene. The amount and type of polyfunctional monomer used in preparing compositions 2A-2D according to the present invention in this Example are set forth in Table 1. Also set forth in Table 1 are the adjusted pH of the aqueous phase used to prepare each composition of this Example, the percent of steam distilled volatiles and total solids in the final medium of each composition prepared in this Example and the monomer conversion of each composition prepared in this Example.

TABLE 1

| Composition | 1 | 2A | 2B | 2C | 2D |
|---|---|---|---|---|---|
| Styrene Monomer, parts by weight | 99.6 | 99.6 | 99.6 | 99.6 | 99.6 |
| Polyfunctional Monomer, parts by weight | | | | | |
| Allyl methacrylate | 0.4 | 0.4 | — | — | — |
| Divinyl benzene | — | — | 0.1 | 0.2 | 0.3 |
| Adjusted pH, aqueous phase | 6.5 | 6.5 | 6.4 | 6.5 | 6.8 |
| Final Medium Steam Distilled | | | | | |
| Volatiles, % | 2.5 | 1.8 | 0.9 | 1.0 | 1.0 |
| Total Solids, % | 42.7 | 34.1 | 35.4 | 35.3 | 35.4 |
| Monomer Conversion, % | 96.1 | 93.1 | 96.5 | 96.7 | 97.0 |
| Molecular Weight | | | | | |
| Mw, × 1000 | 653 | 924 | 845 | 396 | 652 |
| Mn, × 1000 | 48 | 65 | 57 | 33 | 45 |
| Mw/Mn | 13.7 | 14.3 | 14.9 | 12.0 | 14.4 |
| Z avg Mw, × 1000 | 1778 | 1960 | 1686 | 1029 | 1396 |
| Z + 1 avg Mw, × 1000 | 2282 | 2358 | 1917 | 1322 | 2189 |

The results set forth in Table 1 demonstrate that the method according to the present invention provides high monomer conversion and produces high molecular weight polystyrene resins exhibiting high weight average molecular weights and broad molecular weight distributions.

EXAMPLE 3

The high molecular weight polystyrene resins prepared in Examples 1 and 2 were used as additives in polyphenylene ether-high impact polystyrene resin blends to provide the blends with improved flammability performance, particularly as measured by the Underwriters Laboratory UL 94 5V test. The polymer blend compositions which are tested included approximately 40 to 45 weight percent polyphenylene ether resin, approximately 40 to 45 weight percent high impact polystyrene resin, approximately 10 percent of a flame retardant, and a high molecular weight polystyrene resin produced according to the method of the present invention. The amount of high molecular weight polystyrene resin used in each composition is set forth in Table 2. The UL 94 5V test is a standard test procedure of the Underwriters Laboratory wherein a sample is ignited 5 times in order to assess its flammability performance. Injected molded samples having a thickness of 0.125 inches were used. If a sample resists dripping during the testing procedure, it is assessed a pass rating. As set forth in Table 2, the blend compositions including a high molecular weight polystyrene produced according to the present invention all passed the UL 94 5V test procedure. For comparison, a similar polymer blend composition not including a high molecular weight polystyrene resin according to the present invention was also subjected to the UL 94 5V testing procedure. As indicated in Table 2, this comparative blend composition did not pass the UL 94 5V procedure.

TABLE 2

| High Molecular Weight Polystyrene Composition | Amount in Blend, wt % | UL 94 5 V, Pass |
|---|---|---|
| 1 | 5 | YES |
| 2A | 5 | YES |
| 2B | 3 | YES |
| 2C | 3 | YES |
| 2D | 3 | YES |
| Comparative Example | — | NO |

EXAMPLE 4

The general procedures set forth in Example 2 were followed in order to produce additional high molecular weight polystyrenes 4A-4E according to the present invention. In this Example, the polyfunctional monomer includes in the polymerization method comprised diallyl maleate and the amount of polyfunctional monomer included in the polymerization was varied. Table 3 sets forth the amount of polyfunctional monomer included in each of compositions 4A-4E prepared according to this Example. Table 3 also sets forth various reaction parameters and the molecular weights of the resultant polystyrene resins.

TABLE 3

| Composition | 4A | 4B | 4C | 4D | 4E |
|---|---|---|---|---|---|
| Styrene Monomer, parts by weight | 99.6 | 99.6 | 99.6 | 99.6 | 99.6 |
| Polyfunctional Monomer, parts by weight | 0.2 | 0.4 | 0.6 | 0.8 | 1.0 |
| Adjusted pH, aqueous phase | 6.6 | 6.5 | 6.3 | 6.3 | 6.3 |
| Final Medium | | | | | |
| Steam Distilled Volatiles, % | 1.1 | 1.0 | 1.0 | 0.8 | 0.8 |
| Total Solids, % | 34.9 | 35.5 | 35.5 | 35.8 | 35.0 |
| Monomer Conversion, % | 95.6 | 97.3 | 97.0 | 97.7 | 95.0 |
| Molecular Weight | | | | | |
| Mw, × 1000 | 400 | 541 | 926 | 960 | 797 |
| Mn, × 1000 | 58 | 62 | 62 | 57 | 46 |
| Mw/Mn | 6.9 | 8.7 | 14.9 | 16.8 | 17.1 |
| Z avg Mw, × 1000 | 1153 | 1313 | 2211 | 2058 | 1905 |
| Z + 1 avg Mw, × 1000 | 2652 | 1876 | 2748 | 2410 | 2392 |

The result set forth in Table 3 again demonstrate the efficiency of the method according to the present invention in producing high molecular weight polystyrenes.

The results also demonstrate that the high molecular weight polystyrenes produced according to the present invention have high weight average molecular weights and broad molecular weight distributions as evidenced by the ratio Mw/Mn.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A method for producing a high molecular weight polystyrene, comprising polymerizing styrene monomer and from about 0.01 to about 2.0 parts by weight per 100 parts by weight total monomer of a polyfunctional monomer in an emulsion polymerization medium.

2. A method as defined by claim 1, wherein the polyfunctional monomer has at least two functional groups, and further wherein each functional group comprises independently an unsaturated carbon-carbon bond.

3. A method as defined by claim 2, wherein each functional group independently comprises an allyl or vinyl group.

4. A method as defined by claim 3, wherein the polyfunctional monomer is selected from the group consisting of diallyl maleate, triallyl isocyanurate, allyl methacrylate, divinylbenzene bis methacrylates, and bis acrylates.

5. A method as defined by claim 1, wherein the emulsion polymerization medium comprises an initiator selected from the group consisting of persulfate compounds and hydroperoxide redox compounds.

6. A method as defined by claim 1, wherein the polymerization proceeds at a temperature in the range of about 40° to about 80° C.

7. A method as defined by claim 1, wherein from about 0.1 to about 1.0 parts by weight of the polyfunctional monomer are included per 100 parts by weight total monomer.

8. A method as defined by claim 1, wherein the monomers which are polymerized consist essentially of the styrene monomer and the polyfunctional monomer.

9. A method as defined by claim 1, wherein the emulsion polymerization medium comprises an aqueous medium with monomer as a dispersed phase, an emulsifier and a free radical initiator.

* * * * *